United States Patent
Zhang et al.

(10) Patent No.: US 11,474,251 B2
(45) Date of Patent: Oct. 18, 2022

(54) GM-APD ARRAY LIDAR IMAGING METHOD AND SYSTEM UNDER STRONG BACKGROUND NOISE

(71) Applicant: HUAZHONG UNIVERSITY OF SCIENCE AND TECHNOLOGY, Hubei (CN)

(72) Inventors: Tianxu Zhang, Hubei (CN); Hongshi Sang, Hubei (CN); Zhijian Tu, Hubei (CN); Yufeng Liu, Hubei (CN); Zongkai Cao, Hubei (CN); Li Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 367 days.

(21) Appl. No.: 16/898,404

(22) Filed: Jun. 10, 2020

(65) Prior Publication Data
US 2021/0041568 A1     Feb. 11, 2021

(30) Foreign Application Priority Data
Aug. 8, 2019   (CN) .......................... 201910728379.0

(51) Int. Cl.
| | |
|---|---|
| G01S 17/89 | (2020.01) |
| G01S 7/4863 | (2020.01) |
| G01S 17/06 | (2006.01) |

(52) U.S. Cl.
CPC ............ G01S 17/89 (2013.01); G01S 7/4863 (2013.01); G01S 17/06 (2013.01)

(58) Field of Classification Search
CPC combination set(s) only.
See application file for complete search history.

(56) References Cited

U.S. PATENT DOCUMENTS

2021/0223098 A1*   7/2021   Ledvina ................... G01J 1/44

\* cited by examiner

*Primary Examiner* — Tony Ko
(74) *Attorney, Agent, or Firm* — JCIPRNET

(57) ABSTRACT

The disclosure discloses a Gm-APD array lidar imaging method under strong background noise, comprising following steps: respectively acquiring two sets of cumulative detection data of the Gm-APD array lidar at two different opening times of a range gate of the Gm-APD array lidar under strong background noise; respectively performing a statistic operation on the two sets of cumulative detection data of the Gm-APD array lidar with respect to all pixels, to obtain two cumulative detection result histograms of the Gm-APD array lidar; determining a range interval of the imaging target according to the two cumulative detection result histograms; and acquiring a lidar image by a peak discrimination method in the range interval of the imaging target. The Gm-APD array lidar imaging method according to the present disclosure is capable of improving the laser image quality by eliminating the interference of strong background noise in other range intervals.

8 Claims, 5 Drawing Sheets

GM-APD ARRAY LIDAR IMAGING METHOD AND SYSTEM UNDER STRONG BACKGROUND NOISE

CROSS-REFERENCE TO RELATED APPLICATION

This application claims the priority benefit of China application serial no. 201910728379.0, filed on Aug. 8, 2019. The entirety of the above-mentioned patent application is hereby incorporated by reference herein and made a part of this specification.

BACKGROUND

Technical Field

The present disclosure belongs to the technical field of lidar, and more specifically relates to a Gm-APD array lidar imaging method and system under strong background noise.

Description of the Related Art

The Avalanche Photo Diode (APD) lidar operating in Geiger mode (Gm) has become a research hotspot ever since it has been applied to the lidar field at the end of the 20th century, and has developed rapidly. As a detector of a lidar, Gm-APD has the advantages of high detection sensitivity, low power consumption, small size and high integration, and thus has great research and application values in the field of long-distance and weak signal detection.

The working principle of the Gm-APD lidar is as follows: a laser pulse emitted by a pulse laser illuminates a target through an optical emission system, a small part of the laser pulse is received by a trigger APD to form a timing start signal of a time-to-digital converter (TDC) circuit by a pulse edge detector so as to trigger a timing start operation of the timing circuit, and the other laser pulse is reflected back from the target, received by an optical receiving system, and then enters a Gm-APD detector array. In order to suppress atmospheric backscatter and reduce background noise, the detection system uses range gate technology to improve the detection performance of the system. The detector only responds within the range gate, and does not work outside the range gate, thus rejecting atmospheric backscatter and background noise. After a delay time, the range gate is opened, and an incident photon of the laser echo signal is detected by the detector and triggers the avalanche. Then, the generated avalanche signal is detected, and a timing stop signal is simultaneously output to the TDC circuit, thereby obtaining a flight time of the laser pulse. The Gm-APD lidar has single photon sensitivity and is extremely sensitive to noise photoelectrons. In addition, the Gm-APD lidar uses digital detection technology, and thus cannot distinguish the signal from noise according to the amplitude of the output. Moreover, due to the existence of dead time, a noise output responded before a signal will directly block the Gm-APD's response to the signal. Therefore, how to effectively suppress noise and restore range information of an imaging target is of great significance for improving the detection performance of the Gm-APD lidar.

The Gm-APD lidar adopts a cumulative detection method, in which a large number of repeated measurements are performed to obtain a photon count statistics histogram, and the target information is recovered according to the obtained photon count statistics histogram. The common range information restoration algorithms include peak discrimination method, centroid algorithm, self-adaptive filtering algorithm based on correlation method, and fitting algorithm. The fitting algorithm further includes nonlinear least squares fitting, Gaussian fitting, double Gaussian fitting, and so on. All the algorithms acquire multiple frames of laser range images by cumulative detection, and then utilize the difference in statistical characteristic between the target echo and noise (that is, in a case of imaging under weak background noise, for example, in night or indoor, the noise has poor temporal correlation, while the target signal has good temporal correlation) to distinguish the target echo signal from the noise and recover range information of respective pixels of the detector, thereby obtaining a laser range image generated by multi-frame accumulation. In addition, the area-array Gm-APD lidar cannot directly acquire an intensity image, and thus some studies characterize the photon count of the Gm-APD lidar as the intensity information of the target.

However, the above algorithms cannot solve the problem of range information restoration in the case of strong background noise. For example, in the data acquired during the day, the detector may be frequently triggered by solar radiation, and the intensity of background noise may be greater than that of the target echo signal, so that there exists a large amount of noise interference in the generated range image, which greatly limits the applicable environments of the area-array Gm-APD lidar.

SUMMARY

In view of the above-described defects in the art, the present disclosure provides a Gm-APD array lidar imaging method and system under strong background noise, the purpose of which is to improve the image quality of the laser range image and the intensity image generated by the Gm-APD array lidar under strong background noise.

In order to achieve the above objective, according to an aspect of the present disclosure, there is provided a Gm-APD array lidar imaging method, comprising following steps.

(1) Respectively acquiring, by the Gm-APD array lidar, first and second sets of cumulative detection data of at two different opening times of a range gate of the Gm-APD array lidar under strong background noise, wherein the two different opening times are such that the first sets of cumulative detection data is acquired when an imaging target is located in the range gate, and the second sets of cumulative detection data is acquired when the imaging target is located out of the range gate.

(2) Respectively performing a statistic operation on the first and second sets of cumulative detection data with respect to all pixels, to obtain first and second cumulative detection result histograms of the Gm-APD array lidar.

(3) Determining a range interval of the imaging target according to the first and second cumulative detection result histograms.

(4) Acquiring range and intensity information of the imaging target with respect to the respective pixels by using a peak discrimination method in the range interval of the imaging target, to obtain a lidar image.

Further, the lidar image includes a multi-pulse laser range image and a multi-pulse laser intensity image of the imaging target.

Further, in the first and second cumulative detection result histograms of the Gm-APD array lidar, the abscissa represents a range value, and the ordinate represents a detection result count value at a respective range value.

Further, the step (3) comprises following steps.

Subtract a detection result count value at a respective range value in the second cumulative detection result histogram from a detection result count value at a corresponding range value in the first cumulative detection result histogram to obtain a count difference histogram.

Acquire a target interval result histogram according to the count difference histogram in such a way that if a result at a range value in the count difference histogram is larger than a preset threshold $T_1$, the result at the range value is set to 1; otherwise, the result at the range value is set to 0.

Traverse the target interval result histogram, if there are a plurality of consecutive range values where results are 1 and a number of the range values is larger than a preset threshold $T_2$, retain the results at the range values; otherwise, set the results at the range values to be 0.

Further, in the peak discrimination method, a range value for a peak value in the first cumulative detection result histogram is used as a corresponding range value in the multi-pulse laser range image, and a sum of detection result count values within an envelope of the peak value is used as a corresponding gray value in the multi-pulse laser intensity image.

According to another aspect of the present disclosure, there is provided a Gm-APD array lidar imaging system under strong background noise, which comprises a detection data acquisition module configured to acquire first and second sets of cumulative detection data at two different opening times of a range gate of the Gm-APD array lidar under strong background noise; a detection result histogram statistics module configured to respectively perform a statistic operation on the first and second sets of cumulative detection data with respect to all pixels, to obtain first and second cumulative detection result histograms of the Gm-APD array lidar; an imaging target range interval determination module configured to determine a range interval of the imaging target according to the first and second cumulative detection result histograms; and a lidar imaging module configured to acquire a lidar image by using a peak discrimination method within the range interval of the imaging target.

Further, the first and second sets of cumulative detection data are respectively acquired when the imaging target is located in and out of the range gate of the Gm-APD array lidar.

Further, the lidar image includes a multi-pulse laser range image and a multi-pulse laser intensity image of the imaging target.

In general, by comparing the above technical solution of the present inventive concept with the prior art, the present disclosure has the following beneficial effects:

In the Gm-APD array lidar imaging method under strong background noise according to the present disclosure, two sets of laser data with the imaging target in and out of the range gate of the lidar are acquired, a range interval of the imaging target is determined according to the characteristic that detection result statistics histograms of the two sets of laser data have a large difference in the range interval of the target, and imaging is performed by a range restoration algorithm in the range interval, in which the interference of strong background noise in other range intervals is eliminated, thereby improving the laser image quality. In the laser range image, the range information of the target surface is more complete, and the range information restoration effect is significant. In the laser intensity image, the background noise is suppressed while ensuring the intensity of the target echo, and the contrast between the target area and the background area in the image is improved.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the present disclosure described below can be mutually combined if they are not found to be mutually exclusive.

The present disclosure provides a Gm-APD array lidar imaging method and system under strong background noise, the overall idea of which is as follows: in the detection result histograms of data obtained at different range gate positions in a certain time, the background noise and system internal noise have a similar distribution, but significantly different distribution is presented in a range interval of the target, so that the range interval of the target can be determined according to two sets of lidar data respectively obtained when the target is located in and out of the range gate, and when the laser range image and intensity image are generated, noise interference in other range intervals can be eliminated, thereby achieving noise suppression and improving the image quality.

Figure 1:
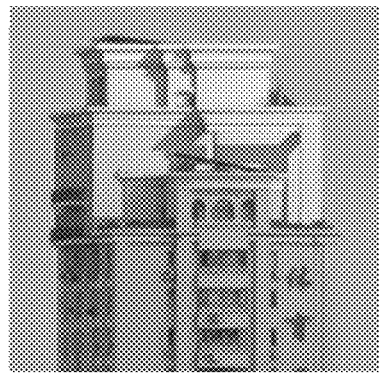
FIG. 1 is a visible light image of a building to be imaged according to an embodiment of the present disclosure.

FIG. 1 is a visible light image of a scene where a building target is located according to the embodiment of the present disclosure. The Gm-APD array lidar imaging method under strong background noise according to the present disclosure will be described in detail below with reference to an example of the ground building shown in FIG. 1 (Laser data comes from the team of Jianfeng Sun in Harbin Institute of Technology).

Figure 2:
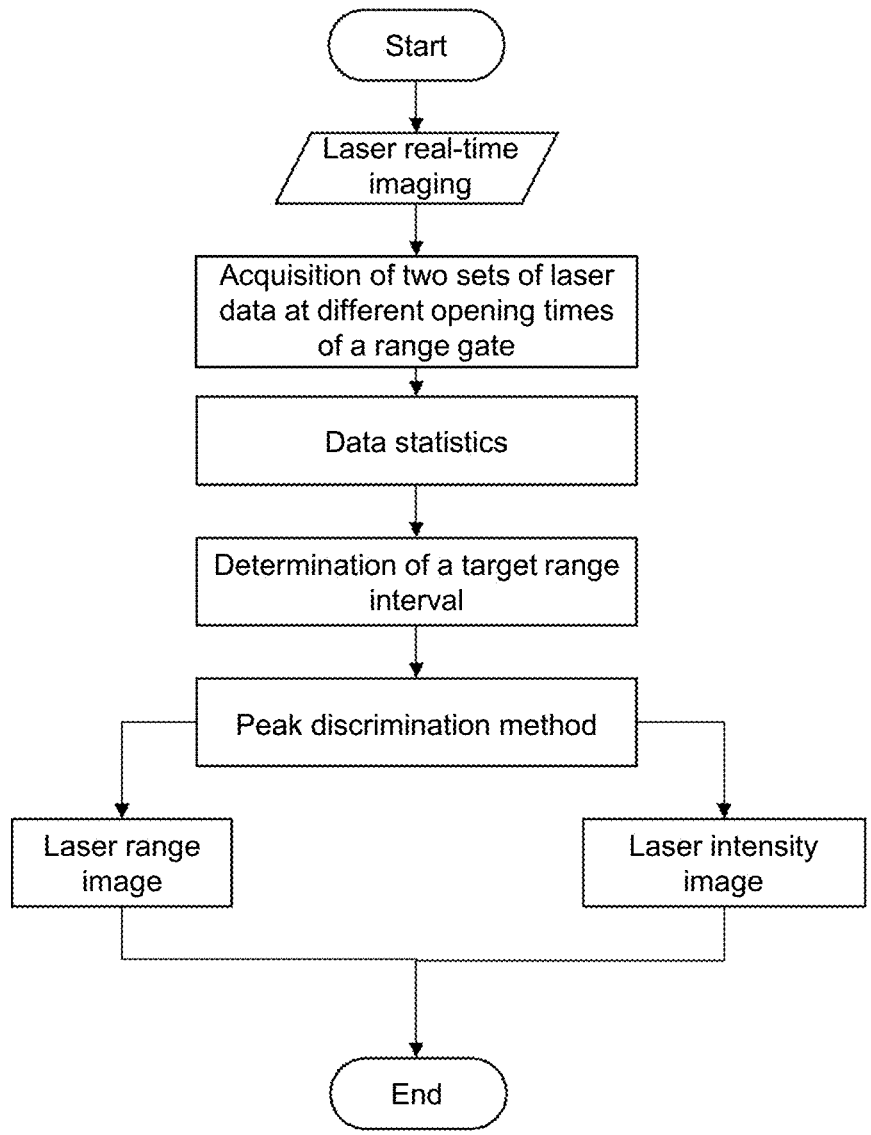
FIG. 2 is a flowchart of a Gm-APD array lidar imaging method under strong background noise according to the embodiment of the present disclosure.

The present disclosure provides a Gm-APD array lidar imaging method under strong background noise, as shown in FIG. 2, and the imaging method comprises following steps:

(1) Acquiring, by the Gm-APD array lidar, two sets of cumulative detection data at two different opening times of a range gate of the Gm-APD array lidar under strong background noise.

Figure 3:
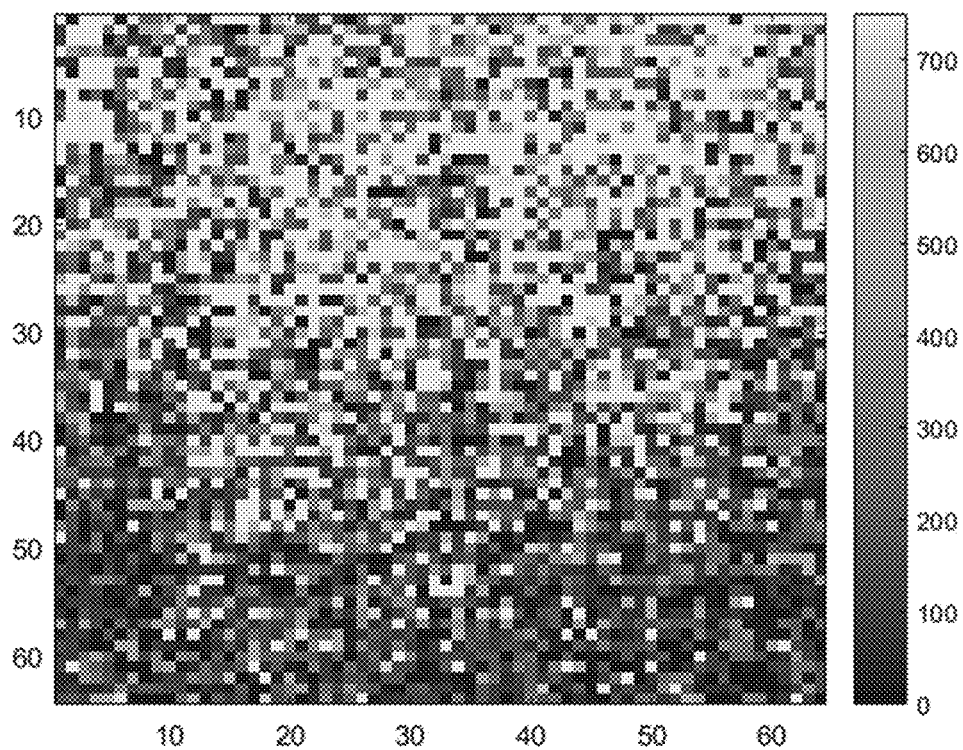
FIG. 3 is a laser range image of the building shown in FIG. 1 obtained by the Gm-APD array lidar in one detection.
Figure 4:
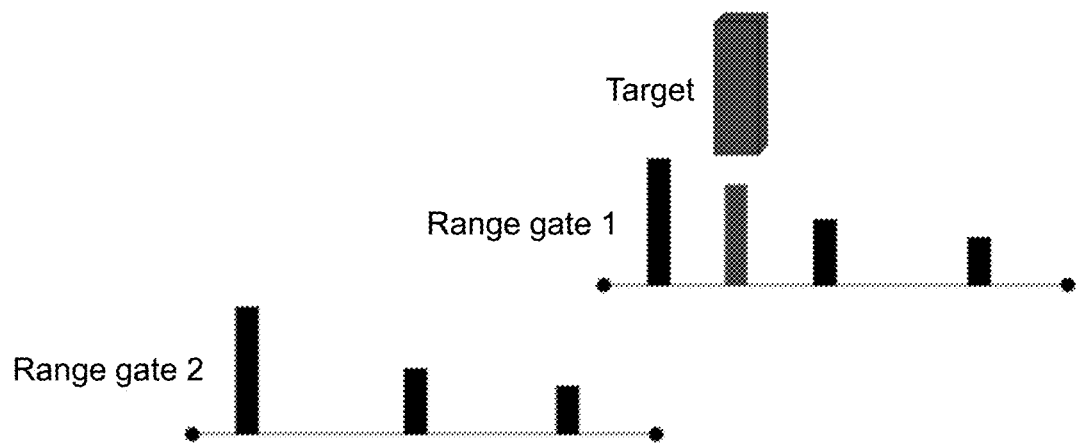
FIG. 4 is a schematic diagram of acquiring two sets of cumulative detection data by the Gm-APD array lidar at two different opening times of a range gate according to the embodiment of the present disclosure.

Specifically, in this embodiment, two sets of laser image data were acquired by using a Gm-APD array lidar at a height of 46 meters and a distance of 2 km from the building target, and each set of laser image data includes 400 frames of laser images. As shown in FIG. 3, the collected laser images each have a size of 64×64 and a range resolution of 0.18 m. Cumulative detection data 1 and cumulative detection data 2 are respectively acquired when the target is located in and out of the range gate, and the range gate positions are shown in FIG. 4.

(2) Respectively performing a statistic operation on the two set of cumulative detection data with respect to all pixels to obtain two cumulative detection result histograms of the Gm-APD array lidar.

Figure 5:
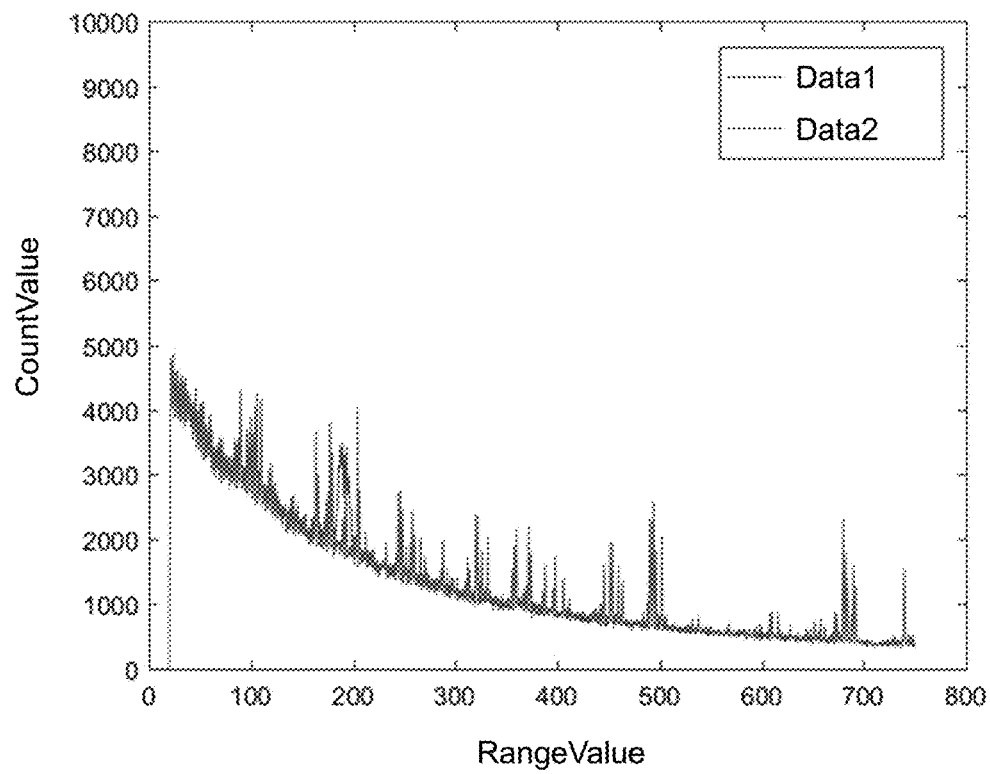
FIG. 5 is a cumulative detection result histogram of the two sets of cumulative detection data according to the embodiment of the present disclosure.

In the cumulative detection result histograms of the Gm-APD array lidar, the abscissa represents a range value, and the ordinate represents a detection result count value at a respective range value. A cumulative detection result histogram 1 is obtained from the cumulative detection data 1, as shown in data 1 in FIG. 5, and a cumulative detection result histogram 2 is obtained from the cumulative detection data 2, as shown in data 2 in FIG. 5.

(3) Acquiring a range interval of a target according to the two cumulative detection result histograms.

The method of acquiring the range interval of the target is specifically as follow.

Figure 6:
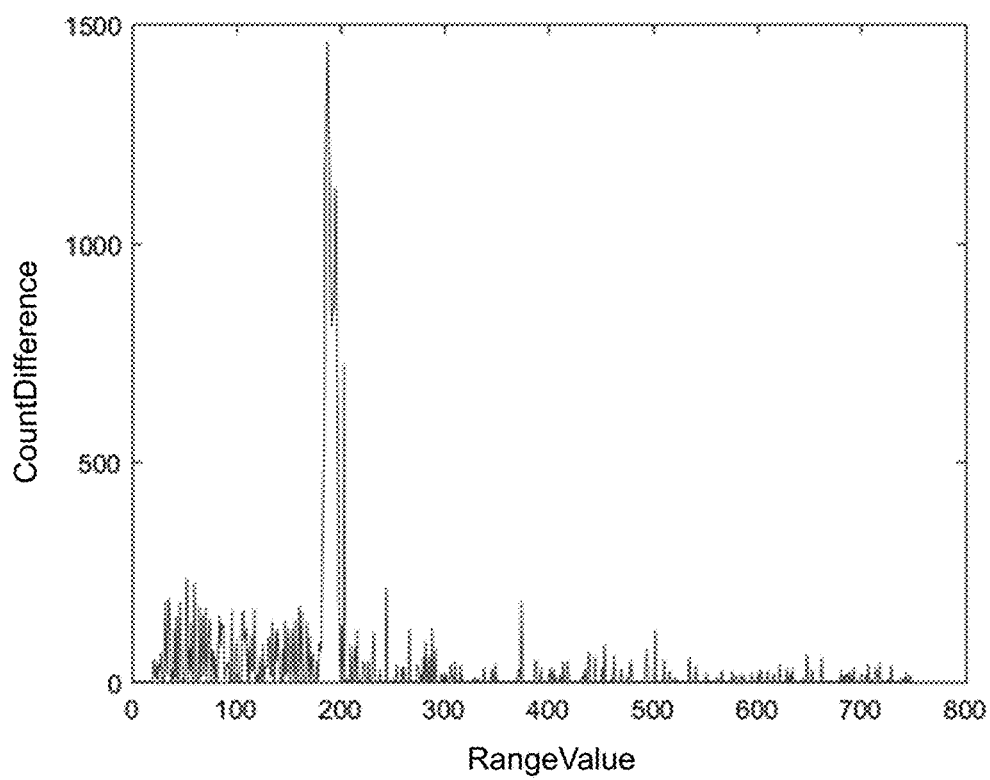
FIG. 6 is a count difference histogram of the two sets of cumulative detection data according to the embodiment of the present disclosure.

The cumulative detection result histogram 1 is obtained when the imaging target is located in the range gate, the cumulative detection result histogram 2 is obtained when the imaging target is located out of the range gate, and the detection result count value at a respective range value in the cumulative detection result histogram 2 is subtracted from the detection result count value at a corresponding range value in the cumulative detection result histogram 1 to obtain a count difference histogram, as shown in FIG. 6.

Figure 7:
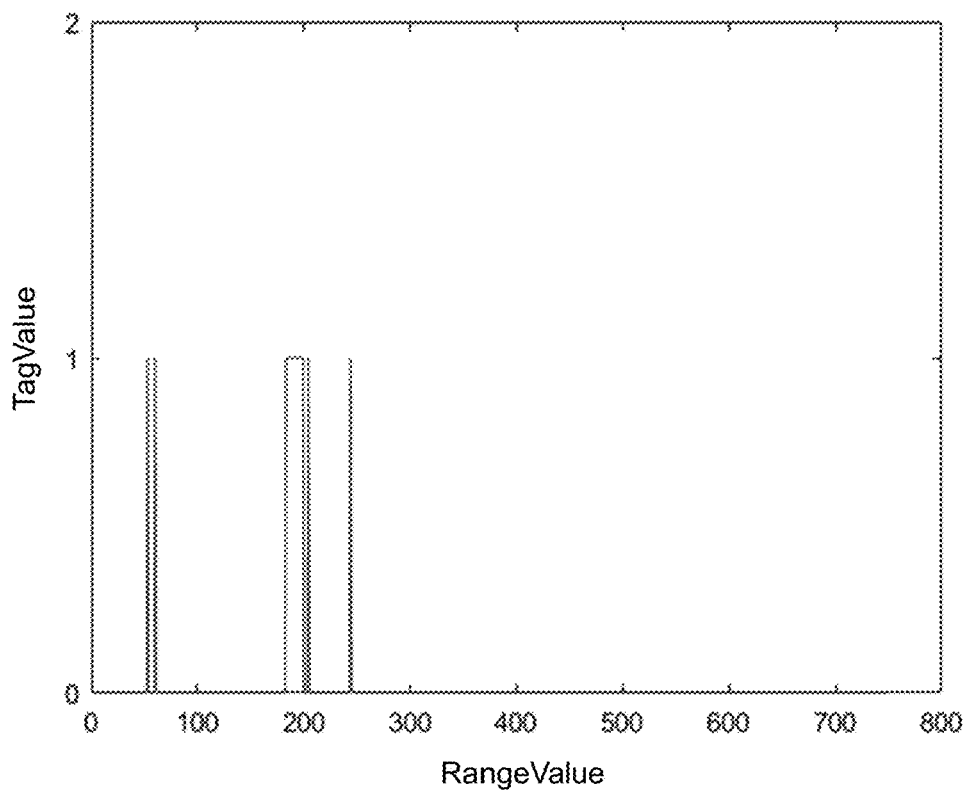
FIG. 7 is a target interval result histogram according to the embodiment of the present disclosure.

A target interval result histogram is obtained according to the count difference histogram in such a way that if a result at a range value in the count difference histogram is larger than a preset threshold $T_1$, the result at the range value is set to 1; otherwise, the result at the range value is set to 0, as shown in FIG. 7.

Figure 8:
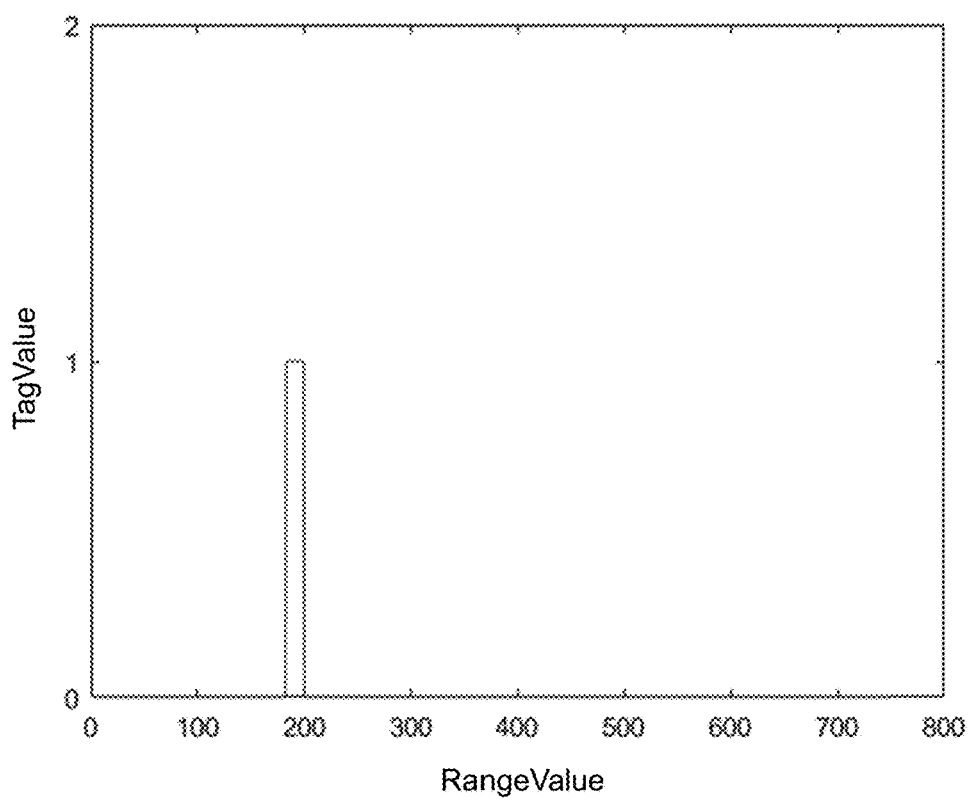
FIG. 8 is a final target interval result histogram according to the embodiment of the present disclosure.

The target interval result histogram is traversed, and if there are a plurality of consecutive range values where results are 1 and a number of the range values is larger than a preset threshold $T_2$, the results at the range values are retained; otherwise, the results at the range values are set to 0, as shown in FIG. 8.

$T_1$ and $T_2$ are preset thresholds, and can be determined according to actual requirements. In this embodiment, the preset threshold $T_1$ is preferably 200, and the preset threshold $T_2$ is preferably 1.

Figure 9A:
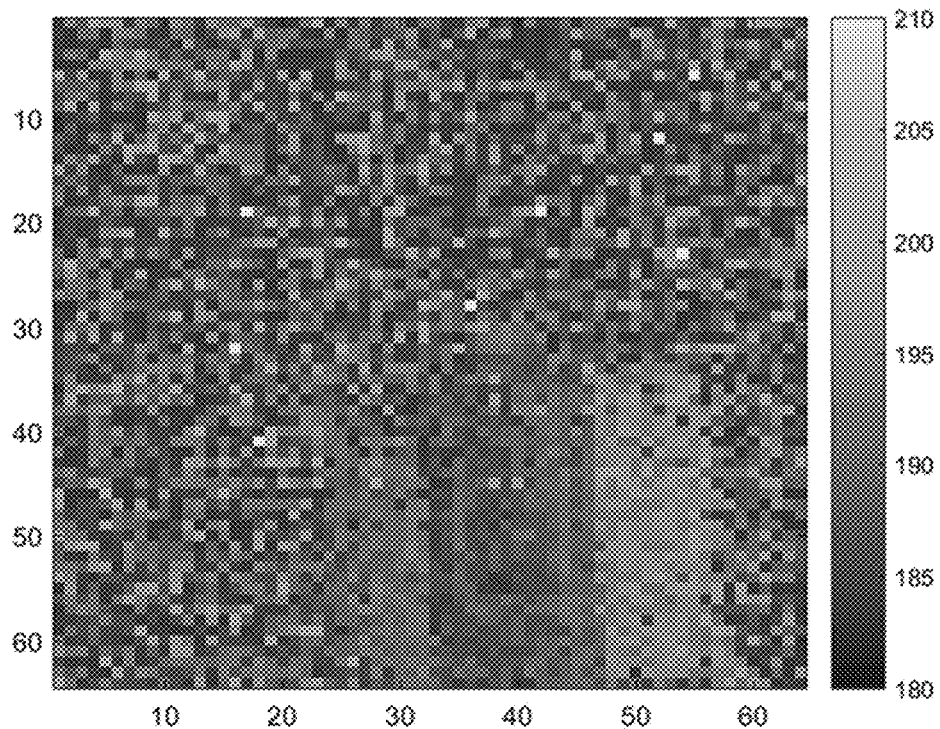
FIG. 9(a) is a range image obtained by the GMD-APD array lidar under strong background noise according to the embodiment of the present disclosure.
Figure 9B:
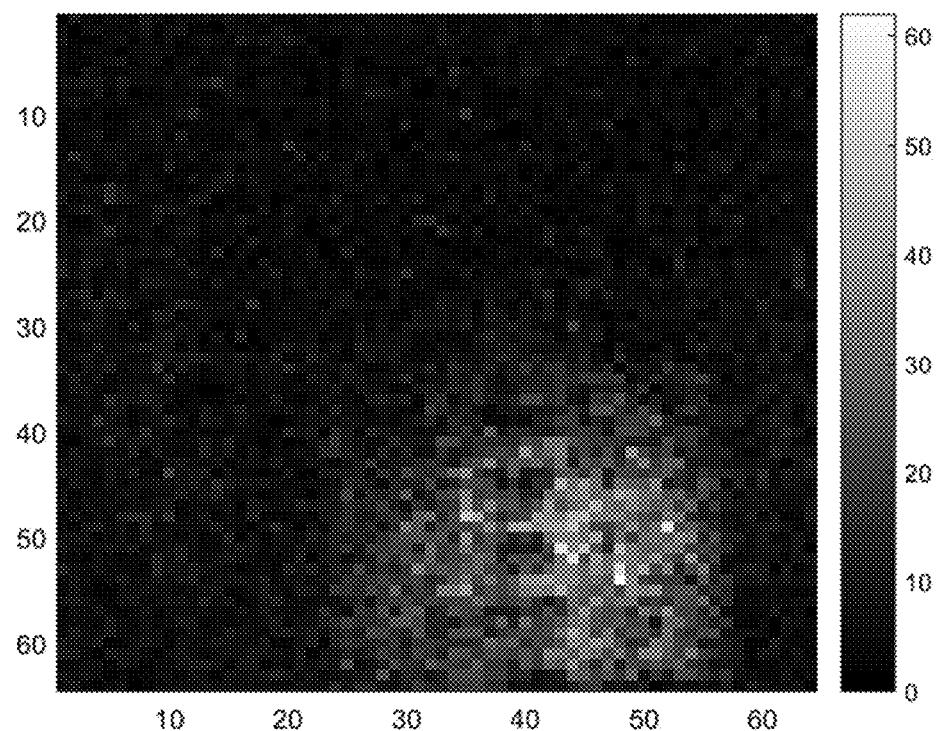
FIG. 9(b) is an intensity image obtained by the GMD-APD array lidar under strong background noise according to the embodiment of the present disclosure.

(4) Acquiring range and intensity information of the imaging target with respect to the respective pixels by using a peak discrimination method in the range interval of the imaging target, to obtain a laser range image and a laser intensity image, in which a range value for a peak value in the cumulative detection result histogram is used as a corresponding range value in the multi-pulse laser range image, and a sum of detection result count values within an envelope of the peak value is used as a corresponding gray value in the multi-pulse laser intensity image, as shown in FIGS. 9(a) and 9(b).

Two sets of laser data with the imaging target in and out of the range gate of the lidar are acquired, a range interval of the imaging target is determined according to the characteristic that detection result statistics histograms of the two sets of laser data have a large difference in the range interval of the target, and imaging is performed by a range restoration algorithm in the range interval, in which the interference of strong background noise in other range intervals is eliminated, thereby improving the laser image quality. In the laser range image, the range information of the target surface is more complete, and the range information restoration effect is significant. In the laser intensity image, the background noise is suppressed while ensuring the intensity of the target echo, and the contrast between the target area and the background area in the image is improved.

Specifically, the imaging target is respectively located in and out of the range gate of the Gm-APD array lidar.

Specifically, in the cumulative detection result histograms of the Gm-APD array lidar, the abscissa represents a range value, and the ordinate represents a detection result count value at a respective range value in the cumulative detection process.

The present disclosure further provides a Gm-APD array lidar imaging system under strong background noise, and the imaging system includes a detection data acquisition module configured to acquire two sets of cumulative detection data of the Gm-APD array lidar at two different opening times of a range gate of the Gm-APD array lidar under strong background noise; a detection result histogram statistics module configured to respectively perform a statistic operation on the two sets of cumulative detection data of the Gm-APD array lidar with respect to all pixels, to obtain two cumulative detection result histograms of the Gm-APD array lidar; an imaging target range interval determination module configured to determine a range interval of the imaging target according to the two cumulative detection result histograms; and a lidar imaging module configured to acquire a lidar image by using a peak discrimination method within the range interval of the imaging target.

Specifically, the two sets of cumulative detection data are respectively acquired when the imaging target is located in and out of the range gate of the Gm-APD array lidar.

Specifically, the lidar image includes a multi-pulse laser range image and a multi-pulse laser intensity image of the imaging target.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A Gm-APD array lidar imaging method under strong background noise, the imaging method comprising following steps:
   (1) respectively acquiring, by the Gm-APD array lidar, first and second sets of cumulative detection data at two different opening times of a range gate of the Gm-APD array lidar under strong background noise, wherein the two different opening times are such that the first sets of cumulative detection data is acquired when an imaging target is located in the range gate, and the second sets of cumulative detection data is acquired when the imaging target is located out of the range gate;

(2) respectively performing a statistic operation on the first and second sets of cumulative detection data with respect to all pixels, to obtain first and second cumulative detection result histograms of the Gm-APD array lidar;

(3) determining a range interval of the imaging target according to the first and second cumulative detection result histograms; and (4) acquiring range and intensity information of the imaging target with respect to the respective pixels by using a peak discrimination method in the range interval of the imaging target, to obtain a lidar image.

2. The imaging method according to claim 1, wherein the lidar image includes a multi-pulse laser range image and a multi-pulse laser intensity image of the imaging target.

3. The imaging method according to claim 1, wherein in the first and second cumulative detection result histograms of the Gm-APD array lidar, the abscissa represents a range value, and the ordinate represents a detection result count value at a respective range value.

4. The imaging method according to claim 1, wherein the step (3) comprises:

subtracting a detection result count value at a respective range value in the second cumulative detection result histogram from a detection result count value at a corresponding range value in the first cumulative detection result histogram to obtain a count difference histogram;

acquiring a target interval result histogram according to the count difference histogram in such a way that if a result at a range value in the count difference histogram is larger than a preset threshold $T_1$, the result at the range value is set to 1; otherwise, the result at the range value is set to 0; and traversing the target interval result histogram, if there are a plurality of consecutive range values where results are 1 and a number of the range values is larger than a preset threshold $T_2$, retaining the results at the range values; otherwise, setting the results at the range values to be 0.

5. The imaging method according to claim 2, wherein in the peak discrimination method, a range value for a peak value in the first cumulative detection result histogram is used as a corresponding range value in the multi-pulse laser range image, and a sum of detection result count values within an envelope of the peak value is used as a corresponding gray value in the multi-pulse laser intensity image.

6. A Gm-APD array lidar imaging system under strong background noise, the imaging system comprising:

a detection data acquisition module configured to acquire first and second sets of cumulative detection data of the Gm-APD array lidar at two different opening times of a range gate of the Gm-APD array lidar under strong background noise;

a detection result histogram statistics module configured to respectively perform a statistic operation on the first and second sets of cumulative detection data of the Gm-APD array lidar with respect to all pixels, to obtain first and second cumulative detection result histograms of the Gm-APD array lidar;

an imaging target range interval determination module configured to determine a range interval of the imaging target according to the first and second cumulative detection result histograms; and a lidar imaging module configured to acquire a lidar image by using a peak discrimination method within the range interval of the imaging target.

7. The imaging system according to claim 6, wherein the first and second sets of cumulative detection data are respectively acquired when the imaging target is located in and out of the range gate of the Gm-APD array lidar.

8. The imaging method according to claim 7, wherein the lidar image includes a multi-pulse laser range image and a multi-pulse laser intensity image of the imaging target.

\* \* \* \* \*